(12) United States Patent
Kim et al.

(10) Patent No.: US 8,055,756 B2
(45) Date of Patent: Nov. 8, 2011

(54) SERVICE SEARCH SYSTEM FOR WIRELESS AD HOC NETWORK, AND SERVICE SEARCHING METHOD THEREOF

(75) Inventors: Min-soo Kim, Seoul (KR); Sang-su Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1718 days.

(21) Appl. No.: 10/929,746

(22) Filed: Aug. 31, 2004

(65) Prior Publication Data

US 2005/0063325 A1  Mar. 24, 2005

(30) Foreign Application Priority Data

Sep. 22, 2003  (KR) .................... 10-2003-0065570

(51) Int. Cl.
*G06F 15/173* (2006.01)
*G06F 15/16* (2006.01)

(52) U.S. Cl. ........ 709/224; 709/223; 709/227; 709/228; 709/229

(58) Field of Classification Search .................. 709/227, 709/228, 229, 223, 224
See application file for complete search history.

(56) References Cited

U.S. PATENT DOCUMENTS

| | | | | |
|---|---|---|---|---|
| 6,167,122 A * | 12/2000 | Titmuss et al. | ............ | 379/93.15 |
| 6,983,326 B1 * | 1/2006 | Vigue et al. | ................... | 709/229 |
| 7,062,269 B2 * | 6/2006 | Albertsson et al. | ........ | 455/432.1 |
| 7,254,608 B2 * | 8/2007 | Yeager et al. | ................. | 709/203 |
| 7,441,038 B2 * | 10/2008 | Arellano et al. | .............. | 709/230 |
| 2002/0061741 A1 * | 5/2002 | Leung et al. | .................... | 455/414 |
| 2002/0069278 A1 * | 6/2002 | Forslow | ........................ | 709/225 |
| 2003/0112804 A1 * | 6/2003 | Kamarainen et al. | ......... | 370/390 |
| 2003/0133554 A1 * | 7/2003 | Nykanen et al. | ......... | 379/201.01 |
| 2003/0143988 A1 * | 7/2003 | Jamadagni | .................... | 455/418 |
| 2004/0059722 A1 * | 3/2004 | Yeh et al. | ........................... | 707/3 |
| 2004/0064532 A1 * | 4/2004 | Schacht et al. | ................ | 709/221 |
| 2004/0103413 A1 * | 5/2004 | Mandava et al. | .............. | 718/100 |
| 2004/0107196 A1 * | 6/2004 | Chen et al. | ........................ | 707/4 |
| 2004/0199616 A1 * | 10/2004 | Karhu | .......................... | 709/221 |
| 2004/0215824 A1 * | 10/2004 | Payrits | ........................ | 709/245 |
| 2004/0233881 A1 * | 11/2004 | Kang et al. | ..................... | 370/338 |
| 2004/0236633 A1 * | 11/2004 | Knauerhase et al. | .......... | 705/26 |
| 2005/0044197 A1 * | 2/2005 | Lai | ................................ | 709/223 |
| 2007/0092203 A1 * | 4/2007 | Iwata et al. | ..................... | 386/83 |

FOREIGN PATENT DOCUMENTS

| | | |
|---|---|---|
| JP | 2001-45029 A | 2/2001 |
| JP | 2001-344163 A | 12/2001 |
| WO | WO 02/065803 A1 | 8/2002 |
| WO | WO 03/003610 A1 | 1/2003 |
| WO | WO 03/034776 A1 | 4/2003 |

* cited by examiner

*Primary Examiner* — Hieu Hoang
(74) *Attorney, Agent, or Firm* — Sughrue Mion, PLLC

(57) ABSTRACT

A service searching system and method for a wireless ad hoc network. According to the present invention, service information on a service agent providing a relevant service is received from a user agent that has previously broadcast a service request packet in a wireless ad hoc network environment, and consequently load on the network can be reduced. Further, service information is received from a user agent, and an additional selection algorithm for storing the service information on a service agent is not required.

7 Claims, 7 Drawing Sheets

FIG. 3
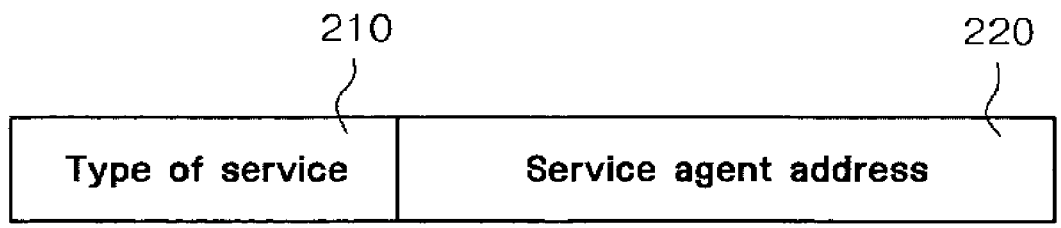
FIG. 4
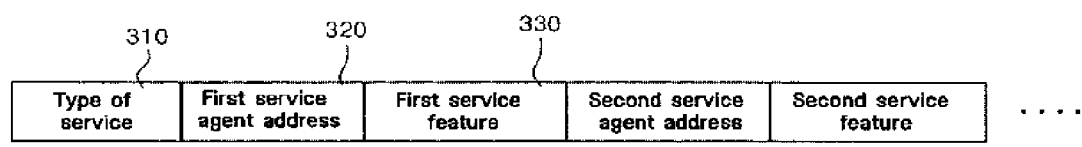
FIG. 5
| Type of service | Service agent address | Service feature | Valid period of time |
|---|---|---|---|
| Service M | xxx.xxx.xxx.xxx | Attributes | T1 |
| ⋮ | ⋮ | ⋮ | ⋮ |

SERVICE SEARCH SYSTEM FOR WIRELESS AD HOC NETWORK, AND SERVICE SEARCHING METHOD THEREOF

BACKGROUND OF THE INVENTION

This application claims the priority of Korean Patent Application No. 10-2003-0065570 filed on Sep. 22, 2003, in the Korean Intellectual Property Office, the disclosure of which is incorporated herein in its entirety by reference.

1. Field of Invention

The present invention relates to a service search system and method for a wireless ad hoc network, and more particularly, to an efficient service searching system and method for a wireless ad hoc network, which enables efficient searches of services due to reduction in load by preventing unnecessary broadcasts in a wireless ad hoc network environment.

2. Description of the Prior Art

A typical service search system for a wired network environment, as shown in FIG. 1, comprises a user agent 10 requesting a desired service, a service agent 20 for providing the service requested by the user agent 10, a directory agent 30 for storing information on the service agent 20 therein and sending the information on the service agent 20 upon reception of a service request from the user agent 10, and a dynamic host configuration protocol (DHCP) 40 for providing the address of the directory agent 30 to the user agent 10.

Further, the user agent 10, the service agent 20, the directory agent 30 and the DHCP 40 are connected to one another via a given wired network 50.

At this time, the service agent information includes the service content, IP address and the like of a service agent providing a relevant service.

Further, the directory agent 30 may be eliminated, if necessary. If there is no directory agent 30, the user agent 10 broadcasts a service request packet and then uses a relevant service through a response sent by the service agent 20 in response to the service request packet.

The operation of the service searching system varies depending on the existence or absence of the directory agent 30. First, a case where there is no directory agent 30 will be discussed. The user agent 10 broadcasts a service request packet through the wired network.

In a case where the service agent 20 that has received the service request packet provides the requested service, the service agent 20 issues a service response in a unicast manner by which a relevant response signal is sent directly to the user agent 10.

Meanwhile, if there is a directory agent 30, the service agent 20 first registers providable services with the directory agent 30.

Thereafter, the user agent 10 finds out the address of the directory agent 30 through the DHCP 40 and requests a desired service.

If there is a service agent 20 capable of providing a service corresponding to the request, the directory agent 30 provides the address of the relevant service agent 20.

If a service agent 20 capable of providing the relevant service does not exist in the directory agent 30, the user agent 10 broadcasts a service request packet.

Meanwhile, as the utility of wireless networks has been recently highlighted, studies have been conducted on service search methods for wireless networks.

As a result, there have been attempts to apply a service, search method for wired networks to wireless networks.

However, since the aforementioned service search system and method have been developed based on a wired network, it causes routing problems in a wireless ad hoc network environment in which respective terminals serve as routers in that the respective terminals should be searched every broadcast and thus a heavy load is exerted on the entire wireless ad hoc network.

Meanwhile, there is a problem with the selection of the directory agent 30 to employ the directory agent in the wireless ad hoc network.

That is, a predetermined selection algorithm should be used to select the directory agent, and as part of this process, a heavy load is caused due to the participation of all terminals in the network.

Moreover, there is a problem in that the efficiency of a terminal selected as a directory agent is degraded since much power and bandwidth is used for service search in the terminal.

There is another problem in that if the terminal selected as the directory agent deviates from radio wave coverage or the supply of power thereto is turned off, it cannot be used and thus a directory agent needs to be selected again, thereby causing heavy load on the network.

SUMMARY OF THE INVENTION

The present invention is conceived to solve the aforementioned problems. An object of the present invention is to reduce load on a network by preventing unnecessary broadcasts in a wireless ad hoc network environment.

The present invention for achieving this object intends to provide a service search system and method for a wireless ad hoc network, wherein the efficiency of a service search can be improved by receiving service information on a service agent providing a relevant service from a user agent that has recently broadcast a service request packet.

According to an aspect of the present invention, there is provided a service search system for a wireless ad hoc network, wherein service information on a given service is received from an arbitrary agent that has previously been provided with the service, and the service information is provided to a third agent requiring the service.

A request list including information on arbitrary agents that have requested the service may be created through service request packets broadcast by the agents that are to receive the relevant service.

The request list may be updated with information on an agent that has recently requested the relevant service.

The request list may include the types of services, addresses of the agents that have requested the relevant service, and flags indicating whether the service information is requested through the agent addresses.

A request for the service information may be made to the agent that has recently requested the relevant service based on the request list, and the service information according to the request may be received.

The service request packet may be broadcast if there is no service information according to the service request.

According to another aspect of the present invention, there is provided a service searching method for a wireless ad hoc network, wherein an arbitrary agent is requested to transmit service information enabling the reception of a relevant service so that the service information is received therefrom, and the service information is provided to a third agent requiring the relevant service.

The method may comprise the step of creating a request list including information on the arbitrary agent that has requested the relevant service.

The method may comprise a first step of requesting an arbitrary agent included in the request list to transmit the service information; and a second step of receiving the service information according to the request and using the relevant service.

The request list may include the types of services, addresses of the agents that have requested the relevant service, and flags indicating whether the service information is requested through the agent addresses.

The method may further comprise the step of, if there is no service information according to the request, broadcasting a service request packet.

BRIEF DESCRIPTION OF THE DRAWINGS

The above and other objects and features of the present invention will become apparent from the following description of exemplary embodiments given in conjunction with the accompanying drawings, in which:

FIG. 3 shows the structure of a service request packet according to the present invention;

FIG. 4 shows the structure of a response packet according to the present invention;

FIG. 5 shows a service list according to the present invention;

DETAILED DESCRIPTION OF THE INVENTION

Hereinafter, preferred embodiments of the present invention will be described in detail with reference to the accompanying drawings.

Figure 1:
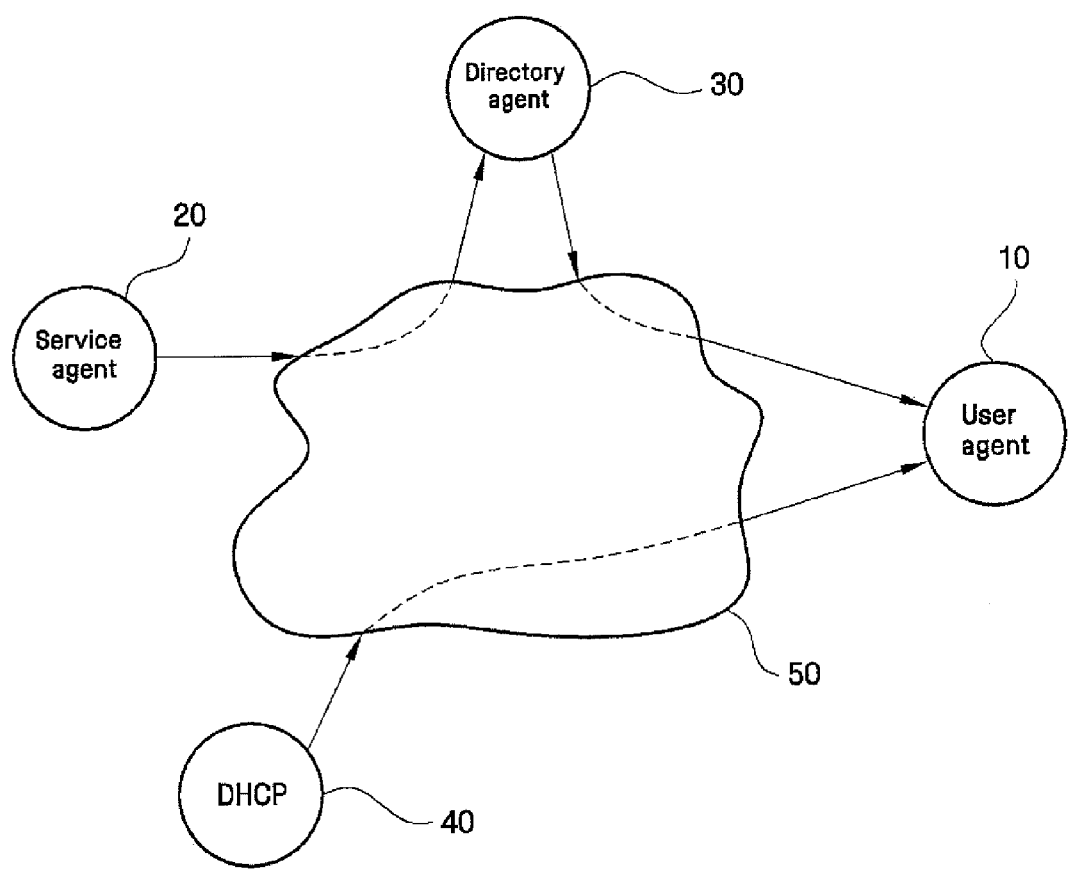
FIG. 1 is a diagram showing a conventional service search system for a wired network.
Figure 2:
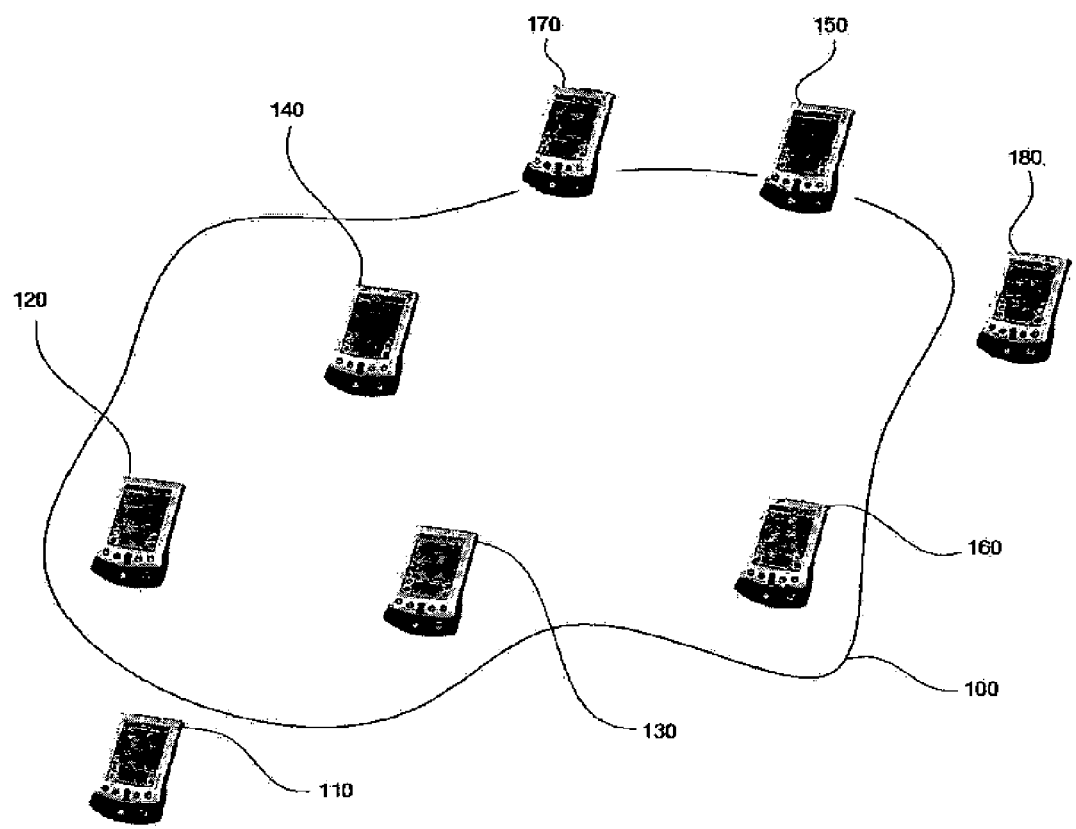
FIG. 2 is a diagram showing a service search system for a wireless ad hoc network according to the present invention.

A service search system for a wireless ad hoc network according to the present invention, as shown in FIG. 2, comprises a plurality of user agents 110, 120, 130 and 140 that send service request packets for requesting given services to the wireless ad hoc network; and a plurality of service agents 150, 160, 170 and 180 providing relevant services to the user agents 110, 120, 130 and 140. The plurality of user agents 110, 120, 130 and 140 and the service agents 150, 160, 170 and 180 are connected to one another through the wireless ad hoc network 100.

At this time, a service request packet includes the type of requested service 210, and an address 220 of a service agent from which a relevant user agent has previously received a service, as shown in FIG. 3.

Further, in response to a service request packet, an arbitrary service agent sends a response packet to the user agent that has sent the service request packet in a unicast manner. The structure of the response packet is shown in FIG. 4.

As shown in the figure, the response packet includes the type of service to be provided 310, an address 320 of a service agent providing the service, features of the provided service 330, and the like.

At this time, since there may be several service agents that provide the same service, the service agent address 320 and the service features 330 may be in several pairs.

Further, a service list including the types of services provided on the wireless ad hoc network, service agent addresses and the like depending on services to be provided through response packets is stored in a user agent that will receive services.

The service list includes the types of services 410, service agent addresses 420, service features 430, valid periods of time 440 for which services are valid, and the like, as shown in FIG. 5. Alternatively, the valid periods of time 440 may be included in the service features 430.

There may be several lists depending on service agents that provide respective services, and a user agent that has requested a relevant service creates a service list based on response packets.

Further, if a service agent providing the requested service is not present in the service list, the service list is updated.

Meanwhile, if an arbitrary user agent broadcasts a service request packet, the service request packet is sent to another user agent present in the network.

That is, it is possible to obtain information on the user agent, which has requested the relevant service, through the sent service request packet.

Accordingly, the other user agent stores the information on the user agent, which has requested the relevant service by broadcasting the service request packet, in a request list.

Thereafter, if another user agent requests the same service, the other user agent can request without broadcasting a service request packet that the user agent which has requested the relevant service transmits service information. Thus, load on the network can be reduced.

Figure 6:
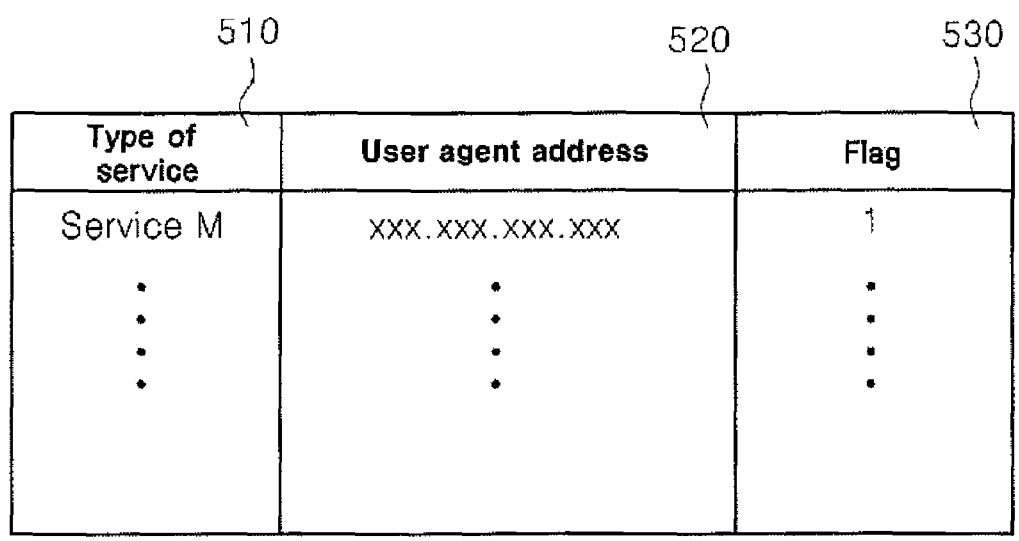
FIG. 6 shows a request list according to the present invention.

Here, the request list includes the types of services 510 requested by arbitrary user agents, addresses 520 of user agents that have requested services, and flags 530 indicating whether the user agent addresses 520 are used, as shown in FIG. 6.

At this time, if a user agent requests service information through an arbitrary user agent address included in the request list, the status of the flag 530 becomes 0. Otherwise, the status of the flag becomes 1.

Thus, when a given service is requested through a user agent, a user agent included in the request list is requested to transmit service information, in the unicast manner without the broadcast of a service request packet, so that the relevant service agent can provide the service.

The service searching method for the wireless ad hoc network according to the present invention, as discussed above, will be described as follows.

Figure 7:
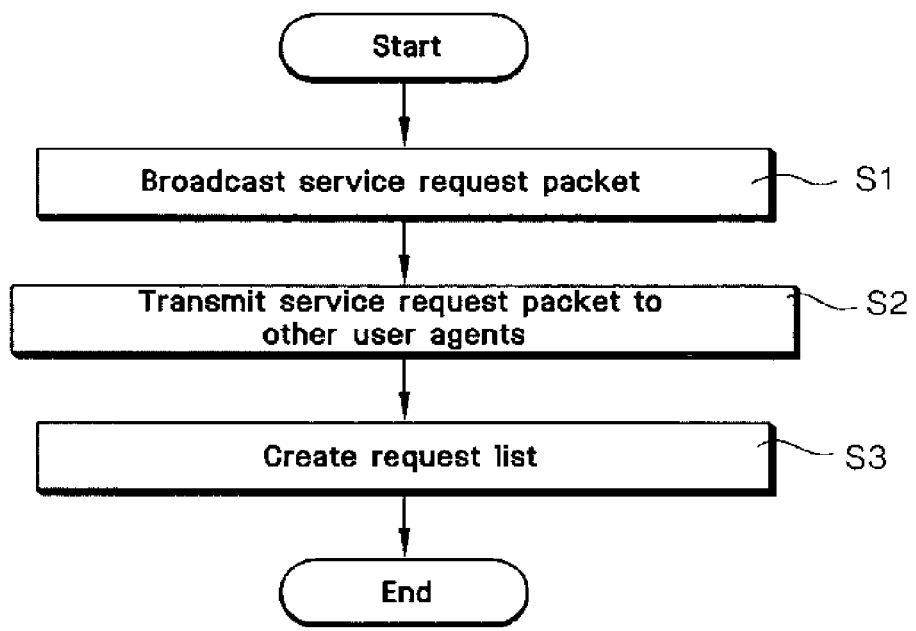
FIG. 7 is a flowchart illustrating a request list creation method according to the present invention.

First, a method of creating a request list according to a service request packet broadcast by an arbitrary user agent will be discussed. As shown in FIG. 7, the arbitrary user agent first broadcasts a service request packet to receive a given service (S1).

User agent information according to the service request packet is sent to other user agents on the network (S2).

Each of the other user agents creates a request list based on the received user agent information (S3).

Figure 8:
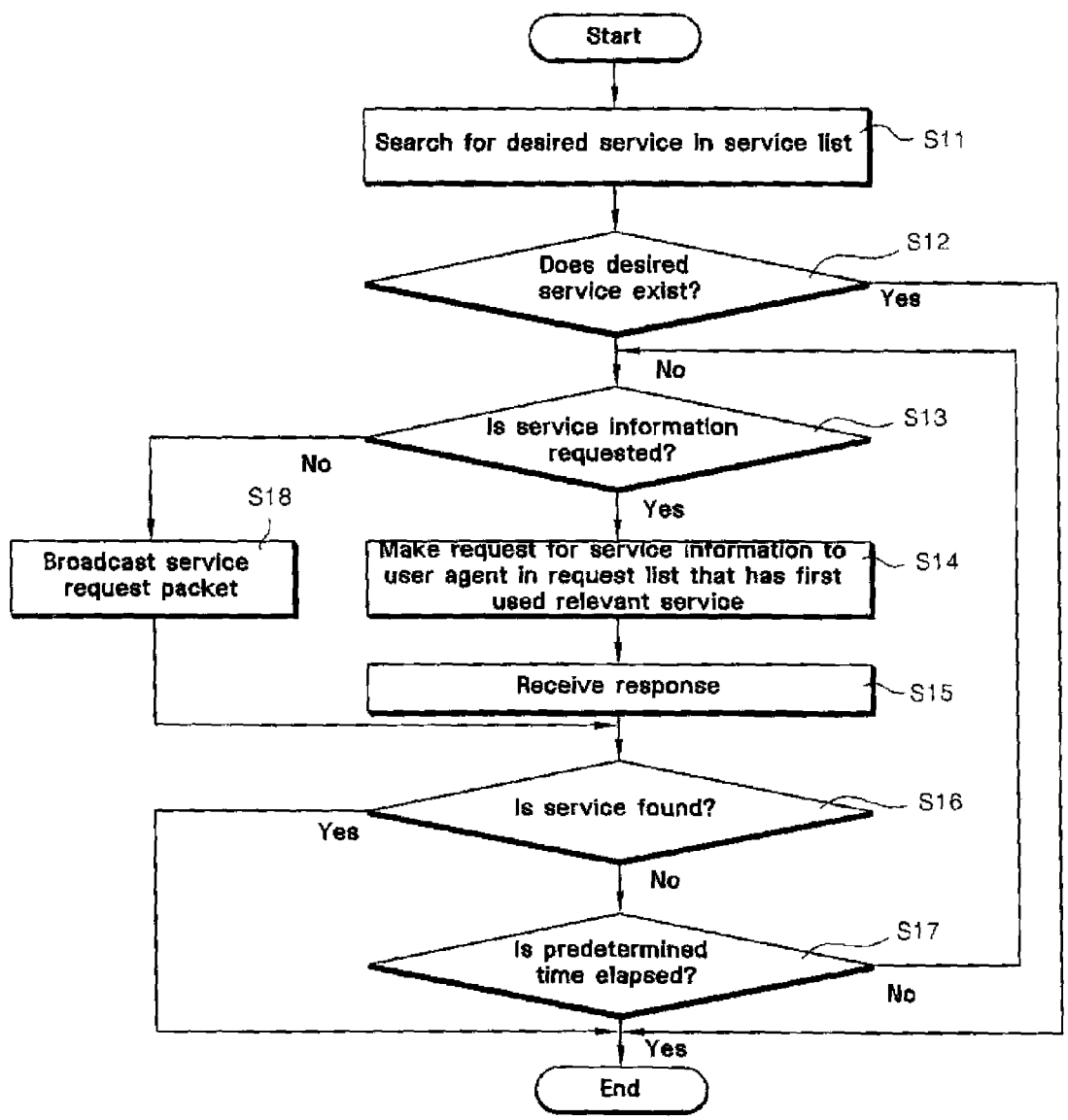
FIG. 8 is a flowchart illustrating a service search method according to the present invention.

Next, a method of requesting a service by an arbitrary user agent when the arbitrary user agent intends to use the service after the request list has been created by means of the aforementioned process will be discussed. As shown in FIG. 8, a service list is first searched to determine whether the relevant service has been previously used (S11).

It is determined through the search of the service list whether the relevant service has been used (S12).

If it is determined that there is no desired service information in the service list, it is determined whether a request for the service information will be made, through the request list, to a user agent that has previously requested the relevant service (S13).

Here, a criterion for the determination on whether the service information will be requested is that a user agent, which will be requested to transmit the service information, has most recently requested the relevant service and the flag should be 1.

Further, another criterion is that the user agent to which the request for the service information will be made has not received a service information request from other user agents.

If it is determined that a request for service information can be made to a user agent that has previously requested the relevant service, the request for the service information is made thereto (S14).

A response to the request is received (S15).

After the response has been received, it is determined whether the desired service is found (S16).

If it is determined that the desired service is not found, the service information is repeatedly requested for a predetermined period of time (S17).

If it is determined in step S13 that the request for the service information is not available, the service is requested through a broadcast (S18).

Figure 9:
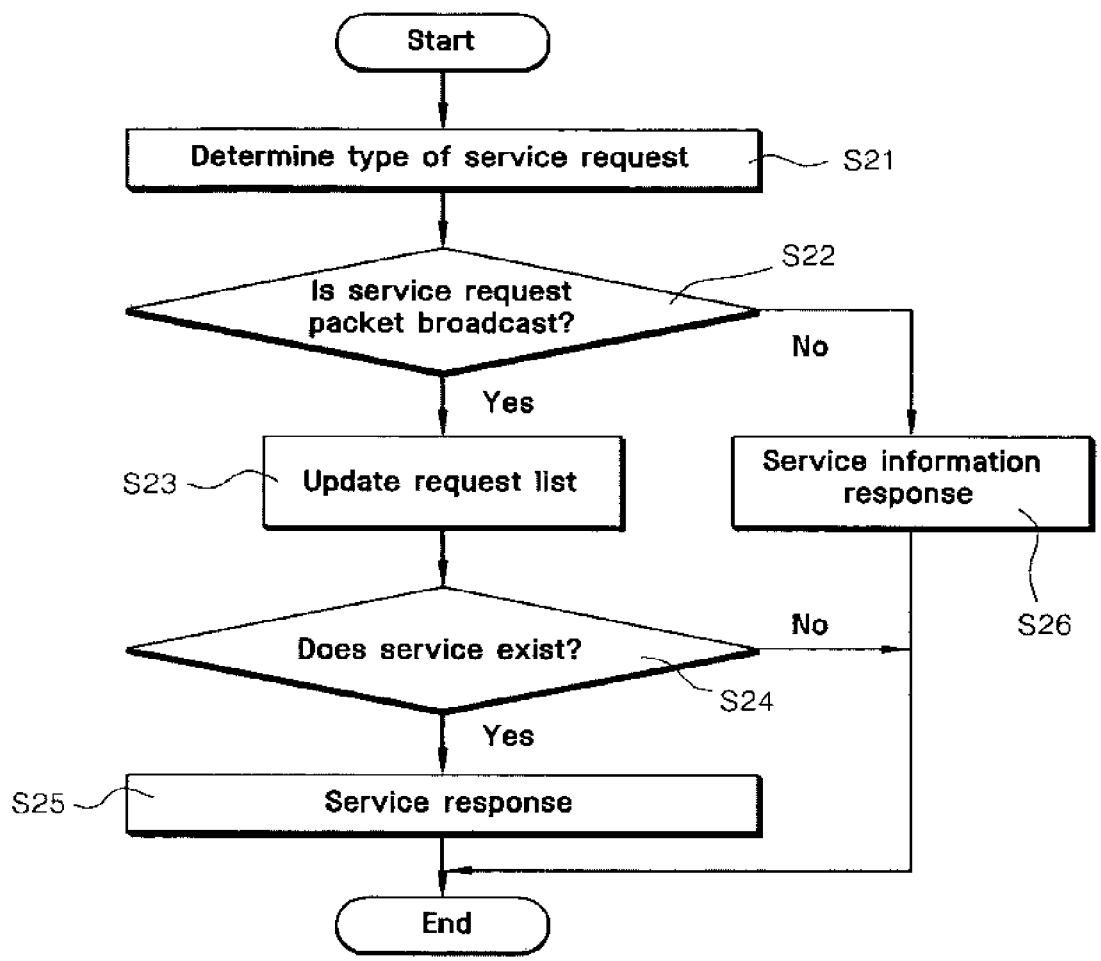
FIG. 9 is a flowchart illustrating a service response method according to the present invention.

Here, a method by which a user agent that has received the request for the service information sends a response to the user agent that has requested the service information will be discussed. As shown in FIG. 9, the type of service request is first determined (S21).

That is, it is determined whether the user agent broadcasts the service request packet or requests the service information in a unicast manner.

If it is determined that a service request packet has been broadcast, the procedure proceeds to step S23 (S22).

The request list is updated (S23).

It is determined whether the requested service exists in the service list (S24).

If it is determined that the requested service exists in the service list, the service information is sent to the user agent that has requested the service (S25).

If it is determined in step S22 that the service information has been requested, a response according to the request for the service information is sent to the user agent that has requested the service (S26).

At this time, the response includes the contents thereof indicating that the service information will be directly transmitted or will be sent after a predetermined time has lapsed if the service information cannot be transmitted at present.

According to the present invention described above, there is an advantage in that since service information on a service agent providing a relevant service is received from a user agent that has previously broadcast a service request packet in a wireless ad hoc network environment, load on the network can be reduced.

Further, there is another advantage in that since service information is received from a user agent, an additional selection algorithm for storing the service information on a service agent is not required, thereby improving the efficiency of a service search.

Although the present invention has been described in connection with the preferred embodiments of the present invention, it will be apparent that those skilled in the art can make various modification and changes without departing from the spirit and scope of the present invention defined by the appended claims. Therefore, simple modifications to the embodiments of the present invention will fall within the technical spirit and scope of the present invention.

What is claimed is:

1. A service search system for a wireless ad hoc network, comprising:

a plurality of user agents and a service agent connected to one another through the wireless ad hoc network, wherein the plurality of user agents comprise a first user agent, and a second user agent requesting a service in the wireless ad hoc network;

the second user agent creates a request list including information on at least one of the plurality of user agents that has requested the service and service request packets broadcast by the at least one of the plurality of user agents;

if the second user agent determines, based on the information included in the request list, that the first user agent has previously requested the service to the service agent, the second user agent requests the first user agent to transmit service information enabling reception of the service by the second user agent and receives the service information from the first user agent without the second user agent broadcasting a service request packet;

if the second user agent determines, based on the information included in the request list, that there is no service information according to the service requested, the second user agent broadcasts the service request packet; and wherein the plurality of user agents and the service agent are hardware devices.

2. The system as claimed in claim 1, wherein the request list is updated with the information on the at least one of the plurality of user agents that has requested the service.

3. The system as claimed in claim 2, wherein the request list comprises:

types of services requested by the at least one of the plurality of agents, user agent addresses of the at least one of the plurality of user agents that have requested the service, and flags indicating whether the service information is requested through the user agent addresses.

4. The system as claimed in claim 2, wherein a request for the service information is made to one of the at least one of the plurality of user agents that has recently requested the service based on the request list; and the service information, according to the request, is received by the second user agent.

5. The system as claimed in claim 4, wherein the request for the service information is made to one of the at least one of the plurality of user agents that has most recently requested the service based on the request list.

6. A service searching method for a wireless ad hoc network comprising a plurality of user agents and a service agent, the plurality of user agents comprising a first user agent and a second user agent requesting a service in the wireless ad hoc network, the service searching method comprising:

creating, by the second user agent, a request list including information on at least one of the plurality of user agents that has requested the service and service request packets broadcast by the at least one of the plurality of user agents;

if the second user agent determines, based on the information included in the request list, that the first user agent has previously requested the service to the service agent, requesting, by the second agent, the first user agent to transmit service information enabling reception of the service by the second user agent, and receiving the service information by the second user agent from the first user agent without broadcasting, by the second user agent, a service request packet; and if the second user agent determines, based on the information included in the request list, that there is no service information according to the service requested, broadcasting, by the second user agent, the service request packet.

7. The method as claimed in claim 6, wherein the request list comprises:

types of services requested by the at least one of the plurality of user agents, user agent addresses of the at least one of the plurality of user agents that has requested the service, and flags indicating whether the service information is requested through the user agent addresses.

* * * * *